(12) United States Patent
Towers et al.

(10) Patent No.: US 8,751,066 B1
(45) Date of Patent: Jun. 10, 2014

(54) INDUSTRIAL REMOTE CONTROL SYSTEM AND METHODS

(71) Applicant: Cooper Technologies Company, Houston, TX (US)

(72) Inventors: Kevin Towers, Fort Langley (CA); Andrew Dueckman, Pitt Meadows (CA); Ray Sewlochan, Port Coquitlam (CA)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 13/755,424

(22) Filed: Jan. 31, 2013

(51) Int. Cl.
*G05D 1/00* (2006.01)
*H01L 29/06* (2006.01)
*H01L 51/40* (2006.01)

(52) U.S. Cl.
USPC .................................. 701/2; 257/38; 438/99

(58) Field of Classification Search
USPC ..................... 701/2; 438/99, 182; 257/40, 324
See application file for complete search history.

(56) References Cited

U.S. PATENT DOCUMENTS

| 6,647,328 B2* | 11/2003 | Walker | 701/36 |
| 8,069,772 B1* | 12/2011 | Peterson | 91/361 |
| 2002/0174736 A1* | 11/2002 | Chapman | 74/471 XY |
| 2008/0158149 A1* | 7/2008 | Levin | 345/156 |
| 2012/0316686 A1* | 12/2012 | Dueckman | 700/275 |

* cited by examiner

*Primary Examiner* — Thomas Black
*Assistant Examiner* — Tyler Paige
(74) *Attorney, Agent, or Firm* — Armstrong Teasdale LLP

(57) ABSTRACT

Flexible remote control systems and methods avoiding customized control schemes for industrial vehicles are disclosed. The industrial vehicle has a base station and at least one auxiliary system to be remotely controlled by an operator using at least one of a plurality of different control input devices. The remote control system includes a processor-based remote control unit having a plurality of substantially identical connector interface ports each configured to receive associated ones of the plurality of different control input devices. The processor-based remote control unit is configured to sample signals associated with the at least one of the plurality of different control input devices as the at least one of the plurality of different control input devices is manipulated by the operator, map the signals associated with the at least one of the plurality of different control input devices to a control function, and communicate the control function to the base station for execution by the auxiliary system of the vehicle.

29 Claims, 5 Drawing Sheets

INDUSTRIAL REMOTE CONTROL SYSTEM AND METHODS

BACKGROUND OF THE INVENTION

The field of the invention relates generally to industrial remote control systems, and more specifically to industrial remote control systems including user manipulated control input devices communicating with a vehicle mounted base station.

Mobile industrial machinery, including but not limited to industrial vehicles such as trucks, are known including auxiliary components and machinery systems that can be remotely controlled by persons using a variety of control input devices. Such auxiliary components and machinery systems are provided for purposes other than propulsion of the vehicle (or the mobile machine), and typically involve heavy duty actuators to lift or move objects and loads that are generally beyond the capability of human persons to perform. Such mobile machine and industrial trucks include, for example only, concrete pump trucks, concrete boom pumps, concrete mixer trucks, load/haul/dump trucks, skid steer track loaders, truck mounted cranes, tow trucks and auto recovery vehicles, utility trucks, vacuum trucks, service cranes, mixer trucks, material handling equipment, industrial marine vehicles, locomotives, fork lifts, forestry equipment, mining trucks, excavators, track type machines, tunnel boring equipment, chippers and augers, rotator trucks and off road machines.

The control input devices may be hand held or otherwise provided at locations remote from the components and machinery that are integrated into the vehicle or mobile machine. The control input devices communicate with a vehicle mounted base station including one or more electronic control units that accept user inputs via the control input devices, and in response actuates the desired components and machinery according to the inputs. Such remote control systems for industrial vehicles tend to be customized for each application, and significant engineering and manufacturing effort is required to customize the controls interfaces to accommodate each application. For example, known industrial remote control systems of this type tend to involve unique, custom developed low level software and unique, custom engineered cable harnesses for each input device desired, which may vary widely for different industrial applications. While such customized controls have conventionally been provided, they have not completely met the needs of the marketplace and improvements are desired.

BRIEF DESCRIPTION OF THE DRAWINGS

Non-limiting and non-exhaustive embodiments are described with reference to the following Figures, wherein like reference numerals refer to like parts throughout the various drawings unless otherwise specified.

DETAILED DESCRIPTION OF THE INVENTION

Customized remote control systems of the type described above can be effective and may work well for some period of time. Problems may arise, however, with any attempt to expand or modify such control systems as is sometimes desired. Because of the customized remote control system originally provided, the control systems generally lack flexibility to be easily modified without expensive re-engineering of the control system. For example, if a new type of control input device is desired, it generally cannot be easily retrofitted to an existing control system that is customized for a particular application. As another example, if an industrial vehicle is modified to include new components or systems that may be operated with a remote control unit, it is difficult to integrate the control of the new components or systems with an existing, customized control system that was designed for operation without those components or systems that may now be desired.

From a manufacturing perspective, the customized nature of industrial remote control systems introduces certain inefficiencies and drawbacks. The design work needed to configure a remote control system, also because of the customized nature of the remote controls, cannot easily be translated to a new remote control system for another application. Hardware and software differences in the customized systems and any potential new remote control system often frustrate any attempt to apply a previously designed remote control system to another type of vehicle or another application.

Exemplary embodiments of remote control systems and methods are herein described that that avoid these and other problems in the art. The inventive remote control systems and methods described below provide a more universal hardware and software remote control system that may be flexibly applied to a plurality of different industrial applications and that accommodate a plurality of different control input devices. Retrofit applications and modification of remote control systems is therefore an economical option, and equipment manufacturers may provide a modular and expandable remote control unit system amenable for a variety of different applications. Lower cost remote control systems are made possible as engineering of the systems is simplified and customized hardware is avoided, and much flexibility is provided for more readily adapting the remote control systems to specific needs and preferences.

Figure 1:
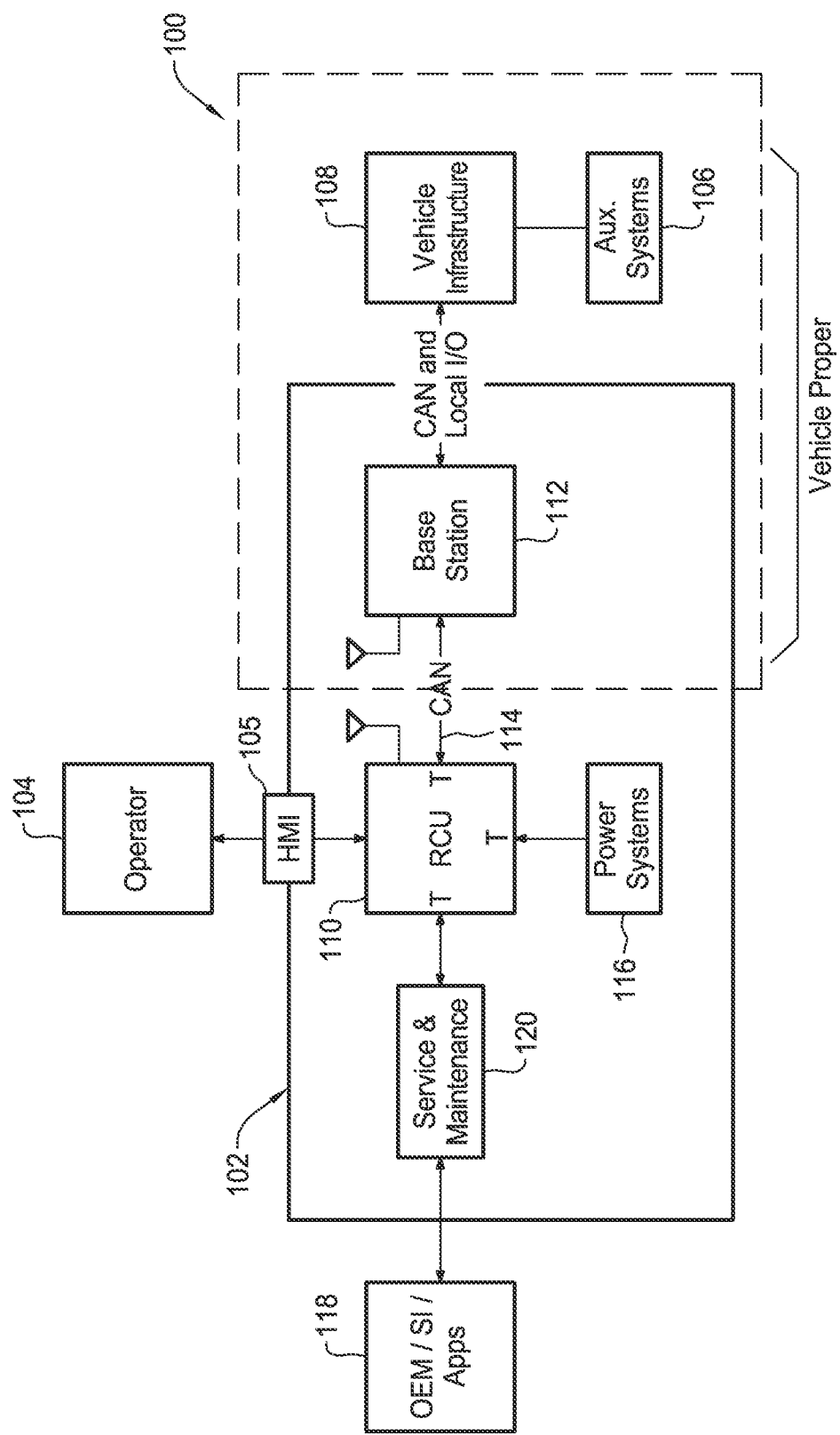
FIG. 1 is a system diagram of an exemplary industrial vehicle including a remote control system according to an exemplary embodiment of the present invention.

FIG. 1 is a system diagram of an exemplary industrial vehicle 100 in combination with a remote control system 102 according to an exemplary embodiment of the present invention. As shown in FIG. 1, the remote control system 102 may be utilized by an operator 104 via a human machine interface (HMI) 105 as explained in more detail below to remotely control and utilize one or more auxiliary components or machinery systems 106 provided on the vehicle infrastructure 108. While the vehicle 100 and the remote control system 102 are shown for explanatory purposes as separate systems having a common element (i.e., the base station 112 described below), the resultant combination could alternatively be characterized as a single system (e.g., a vehicle including the remote control system or a remote control system including the vehicle). Various different subsystems of the elements shown are possible that collectively and in combination provide a functionally similar result to that shown in FIG. 1.

In various embodiments, the industrial vehicle 100 may be any of the industrial trucks and mobile machine discussed above as non-limiting examples. As also mentioned above, the auxiliary components and machinery systems 106 are provided for purposes other than propulsion of the vehicle, and typically involve heavy duty actuators and the like to lift, move or manipulate objects and loads that are generally beyond the capability of human persons to perform.

The remote control system 102 in the exemplary embodiment shown generally includes a processor-based remote control unit 110 communicating with a processor-based base station 112 over a controller area network ("CAN") connection 114. In contemplated embodiments, the base station 112 is mounted to the vehicle 100 and, in turn, communicates with the auxiliary components and machinery systems 106 and, if necessary, appropriate portions of the vehicle infrastructure 108 also using a CAN connection according to known methods and techniques in one contemplated embodiment.

The remote control unit 110 and the base station 112 are each programmable processor-based devices including a processor and a memory storage wherein executable instructions, commands, and control algorithms, as well as other data and information to operate the system are stored. The memory of the processor-based devices may be, for example, a random access memory (RAM), and other forms of memory used in conjunction with RAM memory, including but not limited to flash memory (FLASH), programmable read only memory (PROM), and electronically erasable programmable read only memory (EEPROM).

As used herein, the term "processor-based device" shall refer to devices including a processor or microprocessor as described for controlling the functionality of the device, but also other equivalent elements such as, microcontrollers, microcomputers, programmable logic controllers, reduced instruction set (RISC) circuits, application specific integrated circuits and other programmable circuits, logic circuits, equivalents thereof, and any other circuit or processor capable of executing the functions described below. The processor-based devices listed above are exemplary only, and are thus not intended to limit in any way the definition and/or meaning of the term "processor-based device."

In an exemplary embodiment, the base station 112 may be an R260 Wireless Mobile Control Module Programmable 20-Function CAN Controller available from Omnex Control Systems, a division of Cooper Industries. In other embodiments, other types of base stations may be utilized, and of course, other connections are possible to allow the remote control unit 110 and the base station 112 to communicate, both wired and wirelessly, to facilitate communication between the remote control unit 110, the base station 112, the auxiliary components and machinery systems 106 and the vehicle infrastructure 108. The construction and functionality of the base station and its communication with the auxiliary components and machinery 106 are well known and not described further herein. The base station 112 may optionally communicate with the remote control unit 110 in certain embodiments. That is, in some implementations, bidirectional communication is possible between the remote control unit 110 and the base station 112.

The remote control unit 110 is connected to an electrical power system 116. In one embodiment, the electrical power system 116 may be provided on the vehicle 100. In another embodiment, the electrical power system 116 may include one or more battery power supplies, which may be rechargeable, that are dedicated solely to the remote control unit 110. In still another embodiment, the power system 116 may provide power from an external source other than the vehicle 100 or a dedicated power supply for the remote control unit. In certain contemplated embodiments, the remote control unit 110 may be configured to operate with more than one type of power system 116 (e.g., the vehicle power system and stand alone battery power supplies supplied with the remote control unit 110).

Original equipment manufacturer (OEM) and System Integration (SI) applications and other applications may be provided to the processor-based control unit 110 and also service and maintenance applications 120 may be provided to the remote control unit 110 in a conventional manner. In contemplated embodiments, the service and maintenance applications 120 and the OEM/SI applications 118 are "services" that are off-line. That is, they are not active during normal operation controlling the vehicle, but are used for repair, maintenance, and configuration purposes as non-limiting examples.

Additionally, the OEM/SI applications 118 identifies three entities or groups that access the remote control unit 110 in contemplated embodiments system. The other applications (shown as "Apps") group in the block 118 provides application specific functionality for the remote control unit 110 and/or application specific functionality for the base station 112. The OEM/SI group in the block 118 may customize the application (e.g. change certain behaviors such as timeouts) using the service and maintenance interface (SI) group. The service and maintenance interface (SI) group is also used to implement factory procedures, repair procedures, etc.

Figure 2:
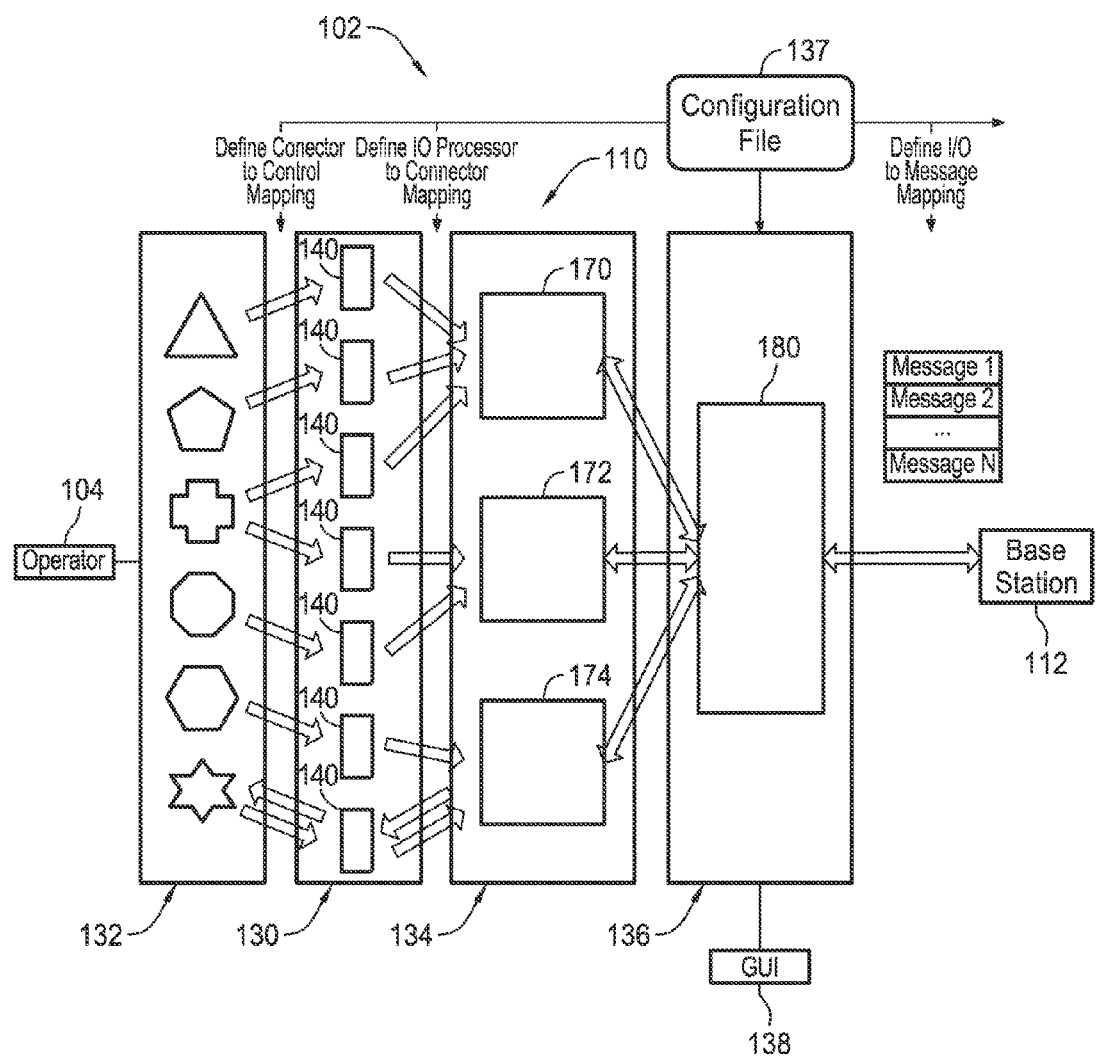
FIG. 2 is a block diagram of a system architecture for the industrial remote control system shown in FIG. 1 according to an exemplary embodiment of the present invention.

FIG. 2 is a block diagram of a system architecture for the industrial remote control system 102 shown in FIG. 1 according to an exemplary embodiment of the present invention. The remote control unit 110 includes, as shown, a connection interface 130 facilitating connection of a plurality of different control input devices 132, an input/output processing interface 134 communicating with the connection interface 130, and a main control unit 136 that communicates with the base station 112. Optionally, a graphic user interface (GUI) 138 may also be provided, and the main processor unit 136 may communicate with the GUI 138 to provide informational displays and/or feedback information for the benefit of the user/operator 104 (FIG. 1).

The connection interface 130 is configured to establish electrical connection to a host of different or dissimilar control input devices represented by the different symbols in FIG. 2. For example, one or more joystick control input devices, one or more paddle input control devices, one or more potentiometers and/or or one or more different types of control input switches may be accommodated by the connections interface 130. Other control input devices are possible in further and/or alternative embodiments. When the various different control input devices are manipulated by the user/operator, the position of the manipulated control input device 132 is communicated through the connections interface 130 to the input/output processing interface 134, which in turn communicates the position to main processor unit 136. The main processor unit 136 can then signal the base station 112 to implement the control input from the input devices 132 to the auxiliary components and systems 106 (FIG. 1) according to the user/operator's input.

As shown in FIG. 2, bidirectional communication is possible between some of the input devices 132 and the connection interface 130, between the connection interface 130 and the input/output processing interface 134, between the input/output processing interface 134 and the main control unit 136, and/or between the main control unit 136 and the base station 112. Varying degrees of feedback may therefore be provided to the operator 104. As also shown in FIG. 2, bidirectional communication may be provided for some of the control input devices 132, but not others, in the remote control system 102. Various other adaptations are possible, however.

As explained in more detail below, each of the different control input devices 132 may themselves represent many different positions selectable by the user/operator 104 to provide a control input to the system. For example, considering a 3-axis joystick control input device, many different positions of the joystick may be selected by the user/operator 104 to achieve different effects in the remotely actuated auxiliary systems and machinery 106 (FIG. 1). A particular component of the auxiliary systems and machinery may be remotely positionable utilizing a 3-axis joystick along three mutually perpendicular axes often referred to as an x axis, a y axis and a z axis to orient the component to a particular position in three dimensional space. As the user/operator moves the joystick to different positions by hand, control signals are generated by the joystick control input device. Using such a joystick, more than one control signal may be simultaneously generated as the user may move the joystick along more than one of the x axis, the y axis and the z axis at the same time. The joystick may also include one or more buttons providing additional control inputs for use by the user/operator.

Likewise, a potentiometer control input may include rotatable or slidable elements in exemplary embodiments, that are positionable to various different positions by the user/operator to finely adjust the output and achieve different effects in the remotely actuated auxiliary systems and machinery 106. A full range of positions may be accommodated between first and second thresholds, which may be on/off or other minimum/maximum thresholds. The potentiometer control inputs may be used for example, to adjust the intensity of actuation of one or more components in the remotely actuated auxiliary systems and machinery 106. As one example, a light may be adjusted in intensity from dim to bright using a potentiometer input, a speed may adjusted between lower speeds and higher speeds, or a force may be adjusted between lower and higher limits.

One or more control input switches may be set in multiple positions by the user/operator 104 to achieve different effects in the remotely actuated auxiliary systems and machinery 106. Thus, a component may be remotely enabled or disabled using, for example, a toggle switch. A two position switch may also be utilized, or as another example a three position switch may be utilized to remotely effect different operating modes of a component or device in the remotely actuated auxiliary systems and machinery 106.

The connections interface 130 allows for seamless addition or subtraction of control input devices using a common or universal interface that avoids a need to custom engineer the control scheme. Multiple and different types of joystick control devices, different types of potentiometers, and different types of switches, as well as other types of input control devices 132, may be simultaneously connected to the connections interface 130 using common or interchangeable electrical interfaces described further below. Using the connections interface 130 and the common electrical interfaces, the set of control input devices 132 may easily be changed or varied from one application to another application without having to re-engineer the system.

Figure 3:
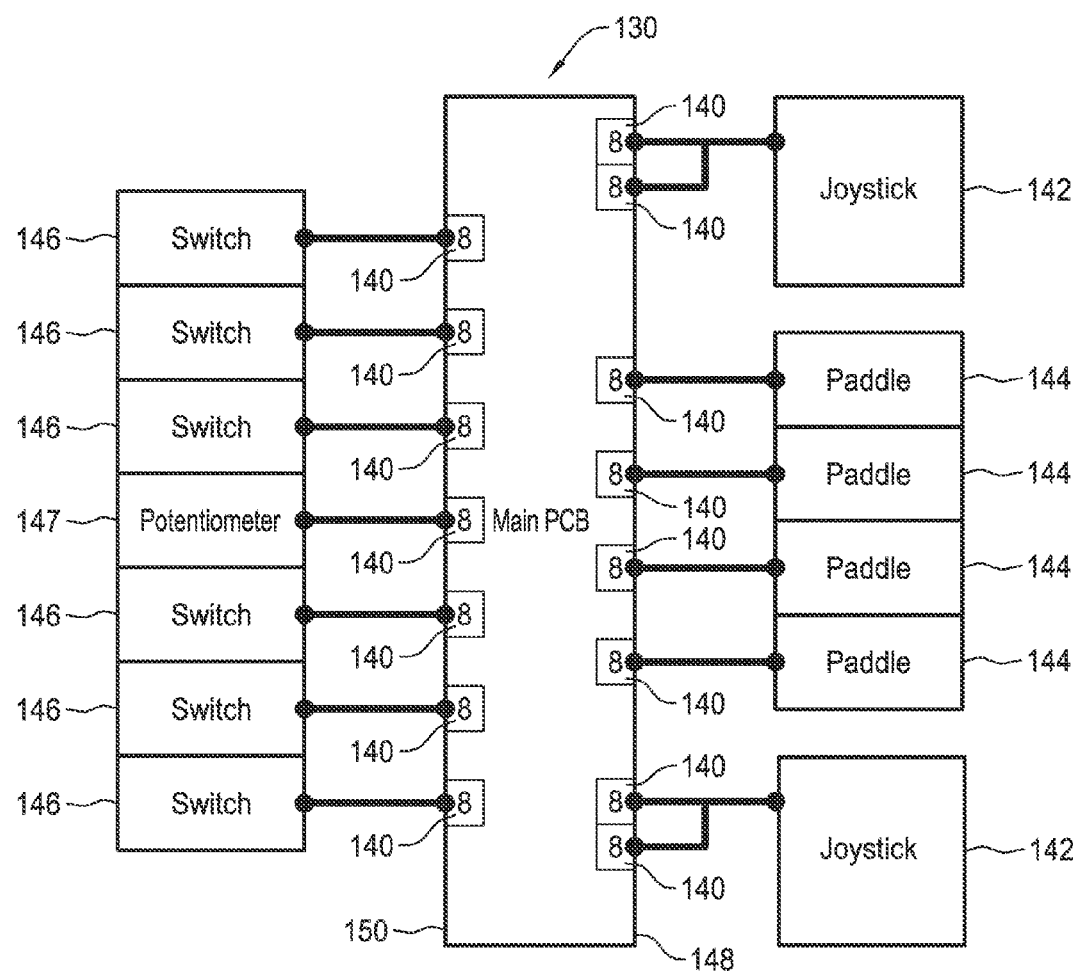
FIG. 3 is an exemplary pin header diagram for a portion of the remote control system shown in FIGS. 1 and 2.

In one contemplated embodiment, the dissimilar control input devices 132 are connected to one or more generic electrical interfaces provided on the connections interface 130. For example, and considering the examples of FIGS. 3 and 4, each electrical interface provided on the connections interface 130 may be provided in the form of a connection port 140. Multiple connection port interfaces 140 may be provided as shown, and in the illustrated example, fifteen connection port interfaces 140 are provided. In the example of FIG. 3, eight connection port interfaces 140 are arranged along a first side 148 of the connections interface 130, and seven connection port interfaces are arranged along an opposing side of the connections interface 130. While fifteen connection port interfaces 140 are shown in the example of FIG. 3, it is understood that greater fewer numbers of connection port interfaces 140 may alternatively be used, and various arrangements of the connection port interfaces 140 may be provided.

In the example of FIG. 3, joystick input control devices 142 are each respectively connected to pairs of the connection port interfaces 140 on the first side 148. Because of the large number of control inputs made possible by a joystick control input device 142, each of the two joystick control input devices 142 shown are connected to two of the connection port interfaces 140. While two joystick input control devices 142 are shown, greater or fewer numbers of joystick input control devices may alternatively be utilized. In certain embodiments, joystick input control devices 142 may be considered optional and may be omitted.

As also shown in the example of FIG. 3, paddle input control devices 144 are each respectively connected to connection port interfaces 140 on the first side 148. While four paddle input control devices 144 are shown, greater or fewer numbers of paddle input control devices 144 may alternatively be utilized. In certain embodiments, paddle input control devices 144 may be considered optional and may be omitted.

Further in the example of FIG. 3, a plurality of switch input control devices 146 are each respectively connected to connection port interfaces 140 on the second side 150. While six switch input control devices 146 are shown, greater or fewer numbers of switch input control devices 146 may alternatively be utilized. In certain embodiments, switch input control devices 146 may be considered optional and may be omitted.

Finally, as shown in the example of FIG. 3, a potentiometer input control device 147 is connected to one of the connection port interfaces 140 on the second side 150. While a single potentiometer input control device 147 is shown, a greater number of potentiometer input control devices 147 may alternatively be utilized. In certain embodiments, potentiometer input control devices 144 may be considered optional and may be omitted.

While exemplary control inputs 142, 144, 146, 147 are shown in the example of FIG. 3, they are intended only for the sake of illustration rather than limitation. Other types of input control devices can be utilized, in addition to or in lieu of the input control devices 142, 144, 146, 147 shown. Additionally, it should be recognized that in certain contemplated embodiments there is no electrical restriction regarding having a particular type of control on one side 150 versus the other side 148. That is, (for example) the potentiometer 147 may just as readily be electrically connected to the side 148 as to the side 150 as shown in FIG. 3.

Figure 4:
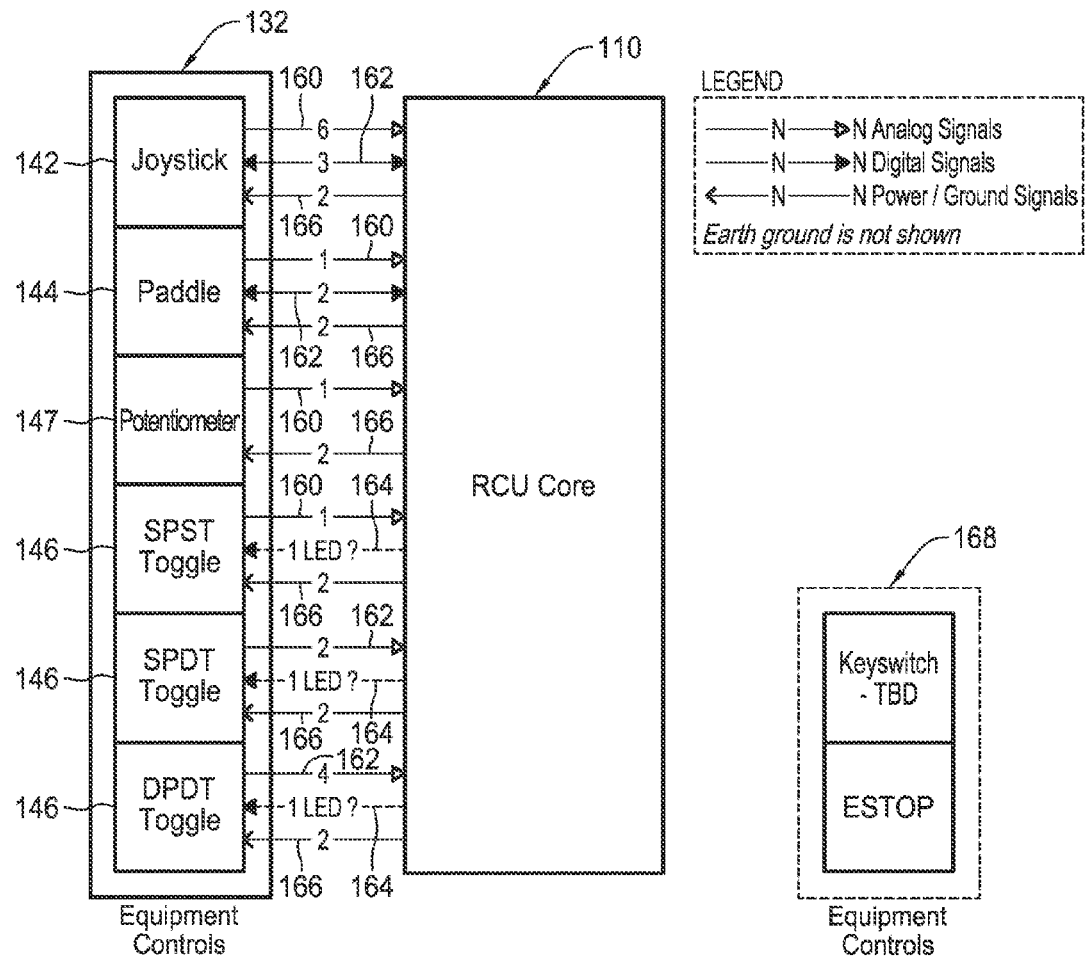
FIG. 4 is an exemplary equipment controls block diagram for the exemplary remote control system shown in FIGS. 1-3.

In an exemplary embodiment, each of the of the connection port interfaces 140 are 8-pin connection ports having five input/output (I/O) signal lines, a power line and a ground line to provide power to the attached control input device at each port, and a shield ground line. Exemplary I/O signal lines 160, 162, 164 and the power and ground lines 166 are illustrated in FIG. 4. As shown in FIG. 4, some of the I/O signal lines 160, 162, 164 may be used for bidirectional communication, while others are not.

The five I/O signal lines in each connection port interface 140 may correspond to either inputs or outputs for a connected control input device 142, 144, 146, 147 via respective cables and connectors. The cables and connectors may be uniformly provided and standardized such that control input devices 144, 146, 147 may each be connected using the same type of cable and connectors. Customized wiring harnesses and customized hardware incompatibilities are therefore avoided and connecting and re-connecting various control input devices 144, 146, 147 is accordingly simplified.

Because the exemplary joystick input control devices 142 involve a greater number of input signals than the exemplary control input devices 144, 146 and 147, different cable harnesses are used for the joystick input control devices 142. Consequently, and when joystick input control devices 142 are desired, different cable harnesses are not completely eliminated to utilize all of the exemplary control input devices 142, 144, 146, 147, but in general the same cable harness can be applied to more than one type of the control input devices 142, 144, 146, 147, thereby reducing complexity and expense of customized cable harness for each control input devices 142, 144, 146, 147. Even though the joystick input control device 142 requires a different cable harness than the devices 144, 146, 147, the joystick input control device 142 can still be readily connected to one of the port interfaces 140 that also provides connection to the other input devices 144, 146, 147.

The five I/O signal lines in each connection port interface 140 may also be either analog or digital signal lines, and in the example of FIG. 4 the analog signal lines are designated as lines 160 and the digital signal lines are designated as the lines 162. Certain of the digital lines 162 may be bidirectional as shown. The input lines 160, 162 receive analog signals provided by the respective control input devices 142, 144, 146, 147 and are output by each connection port interface 140 and provided digitally to the input/output processing interface 134 (FIG. 2). Output lines are designated as lines 164 in FIG. 4 and provide output signals to the respective control input device 142, 144, 146, 147. The output lines 164 may be used to illuminate a light emitting diode (LED) for example or other component of interest to the user/operator or by the respective control input devices 142, 144, 146, 147. Other arrangements are possible, including greater or fewer numbers of input/output lines and other analog/digital designations for the input and outputs of the connection port interfaces 140. As described herein, the input/output directions are referenced to the point of view of the processors in the input/output processing interface 134 rather than to the control input devices 142, 144, 146, 147.

Further inputs may be provided as shown at 168 to, for example, enable or disable operation of the remote control unit 110. In certain embodiments, such additional inputs may be considered optional and may be omitted.

The 8-pin ports of the input/output processing interface 134 may be connected to any of a plurality of generic, interchangeable I/O processors 170, 172, 174 (FIG. 2) in the input/output processing interface 134. These processors each have identical designs and support a large number of re-configurable I/O pins. All of the five I/O signal lines for all of the 8-pin connection port interfaces 140 are connected to reconfigurable analog/digital/input/output pins on the processors. In one contemplated embodiment, reconfigurable pins on the processors are utilized as digital input, digital output, and analog input while analog output pins are not utilized. Other arrangements are possible, however, in further and/or alternative configurations.

Each of the I/O processors 170, 172, 174 is connected to the main processor unit 136 via a serial communications interface, for example. In one example a serial peripheral interface (SPI) bus may be utilized, although other arrangements are possible and may be utilized with similar effect.

The main processor unit 136 may communicate with the base station 112 by one of several channels (e.g. CANBus, RF, etc.) familiar to those in the art. The messages inform the base station 112 of the position of each of the control input devices 132 connected to the interface ports 140 of the connections interface 130. The composition of the message and the required message traffic pattern (frequency, etc.) is application specific along with the "load-out" of the dissimilar control input devices 142, 144, 146, 147.

All of the above communication from the input control devices 132 to the base station 112 is accomplished with signal mapping at each stage of translation. The mapping is provided by a configuration file 137 as shown in FIG. 2. This configuration file is consumed by the remote control unit 110, and more specifically by the main processor 180 thereof, as well as the base station 112. The remote control unit main processor propagates the necessary mapping information to the I/O processors 170, 172, 174 of the I/O interface 134.

The system architecture as described is readily scalable to more or fewer I/O points and can also be scaled to eliminate the I/O processors 170, 172, 174 altogether for very small systems. In such a scenario, the interface 130 and the interface ports 140 may be directly interfaced with the main processor.

In an exemplary implementation, one or more peripheral I/O processors 170, 172, 174 (FIG. 2) in the I/O interface 134 samples an array of analog signals from the control input devices 142, 144, 146, 147 via the interface ports 140 of the connections interface 130. The peripheral processors 170, 172, 174 then communicate the signal values to a main processor 180 (FIG. 2) of the main control unit 136 via an inter-processor protocol. While three peripheral processors 170, 172, 174 are shown, greater or fewer numbers of peripheral processors may be provided to monitor a greater or lesser number of connection ports 140 in the connections interface 130. In another embodiment, an array of analog multiplexors may route the analog signals from the control input devices 142, 144, 146, 147 to the main processor 180 of the main control unit 136. In certain embodiments having small number of interface ports 140, the peripheral processors of the I/O interface may not be necessary and their functionality can be implemented by the main processor 180 of the main control unit 136.

Exemplary signals for one of the input control devices 142, 144, 146, 147, and specifically the joystick input control device 142 are shown below in Table 1 as an illustration of one possible implementation of the remote control system 102. In Table 1, the pins of the interface port 140 are shown in reference to corresponding signal lines of the joystick input control device 142. The connectors A and B in Table represent different ones of the connection interface ports 140 to which the joystick input device 142 is connected. Also in table 1, the X and Y values represent movement of the joystick along its x, y, and z axes, and Button 1 and Button 2 represent buttons provided on the joystick device.

TABLE 1

| Pin | Signal | Connector A | Connector B |
| --- | --- | --- | --- |
| 1 | Power | Power | Power |
| 2 | I/O Point #1 | X2 | Z2 |
| 3 | I/O Point #2 | X1 | Z1 |
| 4 | I/O Point #3 | Y2 | Button1 |
| 5 | I/O Point #4 | Y1 | ButtonCommon (Digital Output) |
| 6 | I/O Point #5 | N/C | Button2 |
| 7 | Ground | Ground | Ground |
| 8 | Earth Ground | | |

Thus, for example, by sampling the pins of the interface port 140 to which the joystick device is connected, signals corresponding to manipulation of the joystick by the user/operator can be detected by the peripheral processors 170, 172, 174 of the I/O interface 134. Considering the example of Table 1, a signal present on pin 3 of each of the connector interface port A indicates movement of the joystick device in a first direction along the x axis, and a signal present on pin 5 of the connector interface port B indicates movement of the joystick device in a first direction along the y axis. All the possible manipulations of the joystick are reflected in the signals represented in Table 1, and as previously mentioned, more than one signal may be presented simultaneously via simultaneous manipulation of the joystick in different ways.

Exemplary pin designations for other of the connection interface ports 140 and associated control input devices 144, 146, 147 are shown below in Table 2. Different types of switch input control devices are shown in table 2 as single pole, single throw (SPST), single pole double throw (SPDT), double pole double throw (DPDT) and keyswitch. POT shall be understood as shorthand for a potentiometer input device 147 in Table 2. As can be seen, the signals represented correspond to the possible physical states of the control input devices 144, 146, 147 in use.

In order to properly execute the mapping of signals and functions, the processors 170, 172, 174 and 180 necessarily require knowledge of which type of control input devices 142, 144, 146, 147 are connected to each respective one of the connector interface ports 140.

In one example, while the various interface connection ports 140 are identical to one another on the connections interface 130, the interfaces may be pre-designated and marked to be connected to a predetermined type of control input device. In such a scenario, one or more of the interface ports 140 may be labeled as a joystick port, one of more of the interface ports 140 may be labeled as a paddle port, one of more of the interface ports 140 may be labeled as a potentiometer port, and one of more of the interface ports 140 may be labeled as a switch port. Thus, from the perspective of the control unit 110, such connectors to specific types of devices may be presumed and accordingly any signal presented on a pin of a joystick port would be mapped as a joystick function with the configuration file, any signal presented on a pin of a paddle port would be mapped as a paddle function with the configuration file, any signal presented on a pin of a potentiometer port would be mapped as a potentiometer function with the configuration file, and any signal presented on a pin of a switch port would be mapped as a switch function with

TABLE 2

| Pin | Signal | Paddle | Pot | SPST | SPDT | DPDT | Keyswitch |
|---|---|---|---|---|---|---|---|
| 1 | Power | Power | Power | Power | Power | Power | Ground |
| 2 | I/O Point #1 | | (Grounded) | | A | A | A |
| 3 | I/O Point #2 | X1 | X1 | A | B | B | B |
| 4 | I/O Point #3 | Center-Off-A | (Grounded) | | (Grounded) | C | C |
| 5 | I/O Point #4 | Center-Off-B | (Grounded) | | (Grounded) | D | D |
| 6 | I/O Point #5 | | (H/W ID) | | (H/W ID) | (H/W ID) | (H/W ID) |
| 7 | Ground | Grounded | Grounded | Grounded | Grounded | Grounded | Grounded |
| 8 | Earth Ground | | | | | | |

By monitoring the interface ports 140, the physical states of all of the input devices 142, 144, 146, 147 connected to the interface 130 may be detected so that associated control commands can be communicated via the I/O interface 134 and the main control unit 136.

Collectively, the interface ports 140 utilized to connect the control input devices 142, 144, 146, 147 presents an array of signals to be sampled by the I/O interface 134. The signals shown in Tables 1 and 2 represent real hardware signals. In an exemplary embodiment, a 5V power supply signal is provided to the control input devices 142, 144, 146, 147 that, in turn, generate one or more voltage signals, for example, on the pins of the connector interface ports 140 as the control input devices 142, 144, 146, 147 are manipulated by the user/operator.

Signals such as those shown in Tables 1 and 2 may be processed by the I/O interface 134 to form logical functions based on the monitored signals. A function is intended to represent an application level, identified entity that may be communicated to the base station 112 for execution. In other words, the sampled signals represent a lower level platform view of the equipment control, while the function represents the higher level applications view of the equipment control.

For example, in the case of Table 2, two electrical signals (A, B) from an SPDT switch may be combined together to form a Boolean (on/off) function. The Boolean function can then be communicated to the base station 112 for execution.

As another example, also in the case of Table 2, one electrical signal (X1) from a paddle may be decomposed to form two functions, such as paddle forward or paddle reverse.

the configuration file. Specially labeled ports could also be provided to accommodate different types of joysticks, different types of paddles, different types of potentiometers, and different types of switches.

In another contemplated embodiment, the control input devices 142, 144, 146, 147 may be connected to any of the connector interface ports 140, but the user/operator or other person must provide an input to the remote control system so that the processors may determine which of the control input devices 142, 144, 146, 147 are connected to the respective connector interface ports 140. Such input may be provided via the GUI 138 (FIG. 2) or by any other means known in the art. A person may select or identify the type of input control device as it is connected to each connector interface port 140 via the GUI or other known input techniques.

In still another embodiment, the control input devices may be self-identifying to the I/O interface as they are connected using known methods and techniques. In such a case, the user/operator or other person need not take any action to identify the control input devices connected to the interface 130.

Regardless of how the processors are provided knowledge of the types of connected control input devices, the configuration file includes mapping information for eligible control input devices such that the mapping of signals into functions as described above can be accomplished. The mapping from signals to functions can be easily changed or modified by introducing new software and/or firmware drivers for new or updated control input devices. Thus, because of the connections interface 130 and its standardized ports and connectors, control input devices can easily be added, removed, and changed by unplugging old control input devices replacing them by plugging in a new device. As long as the configuration file supports the new device, an endless variety of remote control systems are possible using the same hardware interfaces and with minimal software re-engineering.

By sampling the signals from the control input devices and mapping them to functions as described, continuous information may be supplied to the base station 112 concerning the manipulation of the control input devices by the user/operator. The base station 112 can then take appropriate (application specific) action based on the functions received.

Fault conditions may also be detected by sampling the control input device signals, and fault messages may be communicated to the processors of the I/O interface 134, the main control unit 136, and/or the base station 112. In contemplated embodiments, fault messages have higher priority status than analog data messages.

Table 3 illustrates an exemplary implementation of a control input device interface table from which fault conditions can be determined. Table 3 illustrates the pin signals from connector interfaces A and B as noted above for a joystick device. Similar interface tables may be provided for other types of control input devices.

TABLE 3

| A PIN | B PIN | Joystick Signal | Type | Notes |
|---|---|---|---|---|
| A7 | B7 | Ground | Ground | |
| A1 | B1 | Power | Power | The main PCB supplies 5V |
| A2 | | X2 | Analog | X1 + X2 = 5V, Fault otherwise |
| A3 | | X1 | Analog | |
| A4 | | Y2 | Analog | Y1 + Y2 = 5V, Fault otherwise |
| A5 | | Y1 | Analog | |
| | B2 | Z2 | Analog | Z1 + Z2 = 5V, Fault otherwise |
| | B3 | Z1 | Analog | |
| | B4 | Button1 | Contact | To be pulled up externally. Debounced in hardware. |
| | B5 | ButtonCommon | Contact | Digital output |
| | B6 | Button2 | Contact | To be pulled up externally. Debounced in hardware. |
| A6 | | N/C | | Not connected |
| | | Not defined | | 12$^{th}$ pin on Joystick connector. |
| A8 | B8 | EarthGround | | |

Table 4 below illustrates exemplary functions in one contemplated embodiment of the remote control system. Table 4 illustrates exemplary functions as discussed above for a joystick device. Similar interface tables may be provided for other types of control input devices.

TABLE 4

| Joystick Function | Relevant Signals | Notes |
|---|---|---|
| X Deflection | X1, X2 | Signed 8-bit value |
| Y Deflection | Y1, Y2 | Signed 8-bit value |
| Z Deflection | Z1, Z2 | Signed 8-bit value |
| Button 1 State | Button1 | Boolean value |
| Button 2 State | Button2 | Boolean value (Optional/future) |
| X-Center-Off | X1, X2 | Generated Boolean value |
| Y-Center-Off | Y1, Y2 | Generated Boolean value |
| Z-Center-Off | Z1, Z2 | Generated Boolean value |
| Fault Conditions | All | Format TBD. |

As one example, analog signals from the control input devices 142, 144, 146, 147 on the pins of the connector interface ports 140 are sampled by the peripheral processors 170, 172, 174 with at least 8-bits of resolution. In certain embodiments, functions may require decomposition of a single analog signal (e.g. paddle deflection) into separate functions (e.g. forward and reverse), with each function reporting 8-bits of resolution. This implies a resolution of at least 9-bits per analog signal. In contemplated embodiments, the remote control unit 110 may be implemented with ADC sampling having at least 10-bits of resolution for each analog signal being monitored. It should be understood, however, that a lower bit resolution such as 8-bit analog data may be more easily propagated through the data engine of the I/O interface 134. Higher bit resolution may reduce bandwidth and present software latency issues for the system.

Also in contemplated embodiments, all relevant signals provided to the pins of the connector interface ports 140 are sampled every 5 ms to 10 ms, although it is contemplated that other sampling intervals, both greater and smaller, may alternatively be utilized. Performance, however, may be expected to decrease as the sampling period is increased.

It should be noted that not all signals presented on the pins of the connector interface ports 140 may be relevant for sampling purposes. For example, a joystick that does not use the z-axis function need not sample the z-axis signals. Likewise, an unpopulated connector interface port 140 (i.e., an interface port that is not connected to a control input device) need not be sampled.

The array of signals on the pins of the connector interface ports 140 are not sampled atomically in contemplated embodiments, yet they are intended to be logically combined to represent logical states and/or events. This implies that there is a window for ambiguous interpretation of sampled signals, and appropriate steps can be taken to resolve them. Each software driver utilized for the various control input devices (e.g., an SPDT switch) must understand the impact of the non-atomic signal sampling and manage errors appropriately. Such issues may require analysis of every driver utilized.

In the case of a function with redundant inputs, anticipated transitions of the function may be propagated as early as possible. This minimizes latency and is the desired behavior for the normal (success) case. This does potentially propagate transitions prior to validation of the redundant input. A hold-off may also be implemented during which subsequent transitions are ignored (software debouncing). The hold-off resolution is based on the sampling interval requirements, and in such a case, the signals may be re-sampled and re-evaluated to determine the appropriate function at the next (post-hold-off) sample.

Asserting fault conditions based on sampled signals should only be done on stable signals. A double clocking algorithm or equivalent may be implemented to avoid false positives.

If an interface produces contradictory signals (e.g. paddle moved and also centered), then the measurement should be discarded rather than immediately triggering a fault condition, unless perhaps the signal applies to an emergency stop switch (E-STOP) that should immediately provide an interrupt or fault condition. Otherwise, repeated or continuous errors in the sampled figures exceeding predefined tolerances may eventually result in a fault conditions.

If determined, fault conditions may be conveyed to the base station 112 in an independent message or fault conditions may be conveyed to the base station 112 on a per-function basis (e.g. to identify one faulted function in a message that encapsulates many functions). Fail-safe handling of fault conditions should be carefully considered and built into the control scheme. For example, if the fault status is not sent with the analog data, then the system is at risk of temporarily propagating invalid data. The system is then dependent on a subsequent fault message or link timeout to fail-safely. Predetermined timeout threshold values may accordingly be implemented as desired to address invalid data issues.

Figure 5:
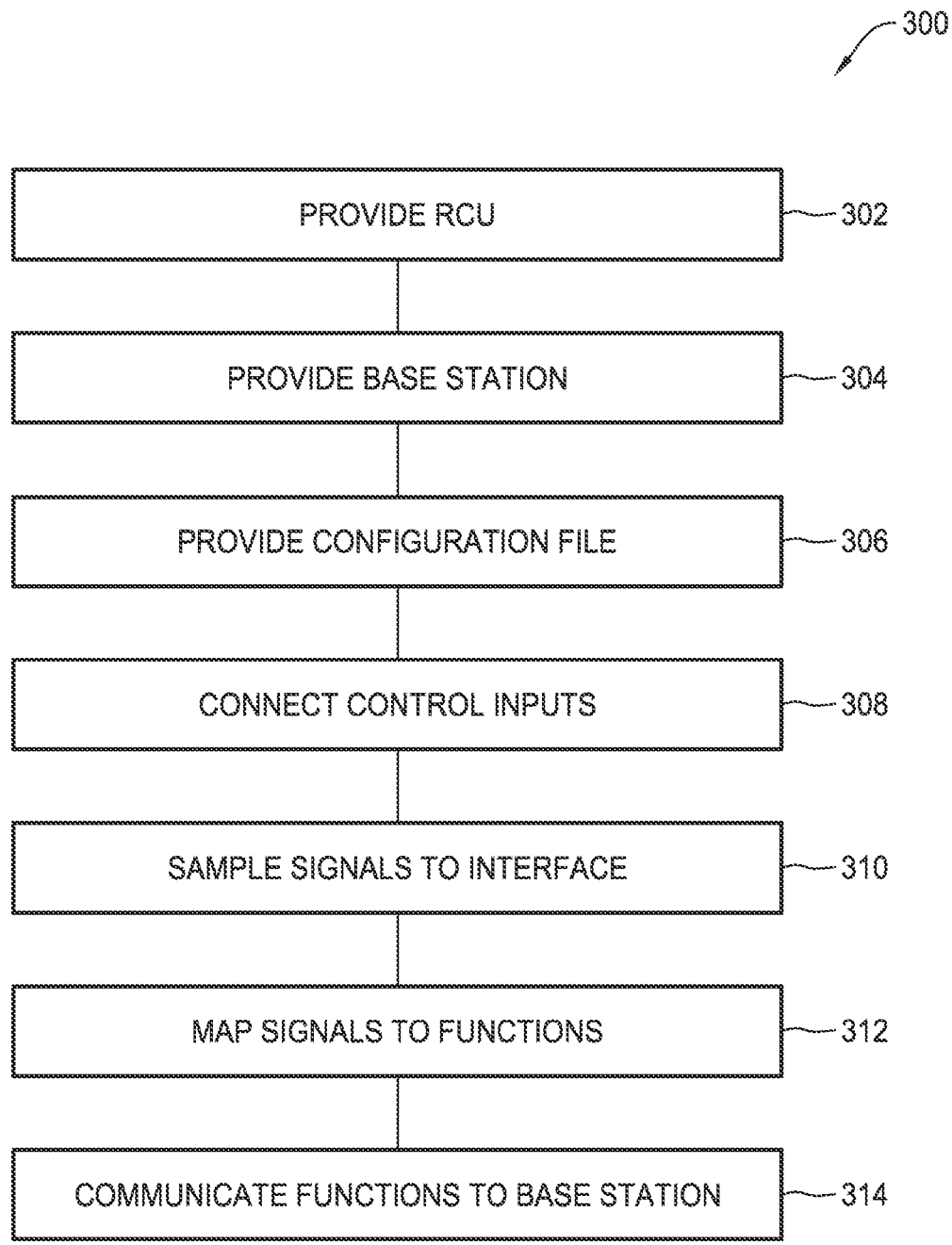
FIG. 5 is an exemplary process flowchart and algorithm for the remote control system shown in FIGS. 1-4.

FIG. 5 illustrates an exemplary process 300 of the remote control system described. At step 302 the remote control unit 110 is provided. At step 304, the base station 112 is provided. At step 306 the configuration file is provided to perform the mapping functions described above. The steps 302, 304 and 306 may occur at the manufacturer level when the industrial vehicle is built, may occur at the maintenance or service level when the industrial vehicle is serviced, may occur at a contractor level when the industrial vehicle is retrofitted with the remote control system, or may occur at the end user level when a preexisting remote control system is replaced or modified to include new or different control input devices.

At step 308, the desired control input devices such as those described above may be connected to the remote control unit 110 via the I/O interface 130. Optionally, and depending on how the remote control unit 110 is configured, the type of control input devices connected to the interface 130 may be identified to the system for signal mapping purposes.

At step 310, the signals supplied to the interface 130 from the control input devices are sampled as described above, and at step 312 the signals are mapped into control functions using the configuration file and the techniques described above. At step 314 the functions are communicated to the base station 112, which can then execute the functions using known techniques to achieve the desired effect with the auxiliary system and machinery.

The steps 310, 312 and 314 may be implemented in appropriate algorithms in the processor-based controls. Having now described the process aspects it is believed that those in the art may program the processor-based remote control unit 110 with appropriate programing of algorithms or otherwise configure it to implement the processes and features shown and described in relation to FIGS. 1-5. It is recognized, however, that not all of the process steps as shown and described are necessary to accomplish at least some of the benefits described. It is further recognized that the sequence of the steps as described are not necessarily limited to the particular order set forth, and that some of the functionality described can be achieved with other sequences of steps. Additional steps beyond those specifically described may also be implemented in combination with the steps described.

Using the systems and methods described, much flexibility is provided at comparatively low cost to customized remote control systems conventionally provided. Different adaptations of the remote control systems to include different control input devices is easily accomplished, as well as expanding or modifying pre-existing systems utilizing the remote control unit 110 and the standard I/O interface 130. But for application specific software relating to the functions of the auxiliary systems and machinery to be remotely controlled, the remote control unit 110 facilitates universal use of a small number of standardized components to suit the needs of a wide variety of applications and end users.

The advantages of the invention are now believed to be evident in view of the exemplary embodiments disclosed.

An embodiment of a remote control system for an industrial vehicle including a base station and at least one auxiliary system to be remotely controlled by an operator using at least one of a plurality of different control input devices has been disclosed. The remote control system includes a processor-based remote control unit comprising a plurality of substantially identical connector interface ports each configured to receive associated ones of the plurality of different control input devices. The processor-based remote control unit is configured to: sample signals associated with the at least one of the plurality of different control input devices as the at least one of the plurality of different control input devices is manipulated by the operator; map the signals associated with the at least one of the plurality of different control input devices to a control function; and communicate the control function to the base station for execution by the auxiliary system of the vehicle.

Optionally, the processor-based remote control unit includes a main processor and at least one peripheral processor, with the at least one peripheral processor sampling the signals. The processor-based remote control unit may include a connections interface, and the substantially identical connector interface ports may be arranged on the connections interface. Each of the substantially identical connector interface ports may include eight pins. Each of the substantially identical connector interface ports may include five input/output pins. At least one cable may connect the at least one of the plurality of different control input devices to one of the substantially identical connector interface ports.

At least one of the plurality of different control input devices may comprise one of a joystick control input device, a paddle control input device, a potentiometer control input device, and a switch control input device. At least one of the plurality of different control input devices may also comprise a plurality of control input devices selected from a group consisting of joystick control input devices, paddle control input devices, potentiometer control input devices, and switch control input devices.

The processor-based remote control unit may optionally include a connections interface configured to interchangeably connect to the plurality of different control input devices. The connections interface may include fifteen of the substantially identical connector interface ports. The connections interface may include a first side having a first number of the substantially identical connector interface ports arranged along the first side, and a second side having a second number of the substantially identical connector interface ports arranged along the second side, the second number being different from the first number.

The signals associated with the at least one of the plurality of different control input devices comprises one of an analog signal and a digital signal. Each of the substantially identical connector interface ports may include a plurality of pins, and wherein at least one of the pins provides an output signal to the at least one of the plurality of different control input devices. The output signal may be one of an analog signal and a digital signal.

The remote control system optionally may include an input element to identify the at least one of the plurality of different control input devices. The input element may include a graphic user interface.

At least one of the plurality of different control input devices may comprise a switch input device, the switch input device being selected from the group consisting of a single pole single throw switch, a single pole double pole switch, a double pole double pole switch, a keyswitch, and an emergency stop switch.

A method of remotely controlling at least one auxiliary system of an industrial vehicle including a base station has also been disclosed. The method is implemented with a processor-based remote control unit interfaced with a plurality of different control input devices via a plurality of substantially identical connector interface ports. The method includes: sampling, with the processor-based remote control unit, signals associated with the at least one of the plurality of different control input devices as the at least one of the plurality of different control input devices is manipulated by an operator;

mapping, with the processor-based remote control unit, the signals associated with the at least one of the plurality of different control input devices to a control function; and communicating the control function to the base station for execution by the auxiliary system of the vehicle.

The processor-based remote control unit may further include a main processor and at least one peripheral processor, and the method may include sampling signals associated with the at least one of the plurality of different control input devices being performed by the at least one peripheral processor. The processor-based remote control unit may also include a connections interface, the substantially identical connector interface ports arranged on the connections interface, and the method further including interfacing the at least one of the plurality of different control input devices via one of the connector interface ports. The method of may also include providing each of the substantially identical connector interface ports with a plurality of signal pins. The method may include providing at least one cable, and connecting the at least one of the plurality of different control input devices to one of the substantially identical connector interface ports via the cable. At least one of the plurality of different control input devices may be one of a joystick control input device, a paddle control input device, a potentiometer control input device, and a switch control input device. Sampling the signals associated with the at least one of the plurality of different control input devices may include sampling one of an analog signal and a digital signal.

The method may include providing an output signal to the at least one of the plurality of different control input devices. Providing the output signal may include providing one of an analog signal and a digital signal. The method may further include identifying, to the processor-based remote control unit, the type of the at least one of the plurality of different control input devices to be manipulated by the operator. The method may also include identifying the type of the at least one of the plurality of control input devices with a graphic user interface. At least one of the plurality of different control input devices comprises a switch input device, the switch control input device being selected from the group consisting of a single pole single throw switch, a single pole double pole switch, a double pole double pole switch, a keyswitch, and an emergency stop switch.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A remote control system for an industrial vehicle including a base station and at least one auxiliary system to be remotely controlled by an operator using at least one of a plurality of different control input devices, the remote control system comprising:
    a processor-based remote control unit comprising a plurality of substantially identical connector interface ports each configured to receive associated ones of the plurality of different control input devices, the processor-based remote control unit configured to:
        sample signals associated with the at least one of the plurality of different control input devices as the at least one of the plurality of different control input devices is manipulated by the operator;
        map the signals associated with the at least one of the plurality of different control input devices to a control function; and
        communicate the control function to the base station for execution by the auxiliary system of the vehicle.

2. The remote control system of claim 1, wherein the processor-based remote control unit comprises a main processor and at least one peripheral processor, the at least one peripheral processor sampling the signals.

3. The remote control system of claim 1, wherein the processor-based remote control unit comprises a connections interface, the substantially identical connector interface ports arranged on the connections interface.

4. The remote control system of claim 1, wherein each of the substantially identical connector interface ports includes eight pins.

5. The remote control system of claim 1, wherein each of the substantially identical connector interface ports includes five input/output pins.

6. The remote control system of claim 1, further comprising at least one cable connecting the at least one of the plurality of different control input devices to one of the substantially identical connector interface ports.

7. The remote control system of claim 1, wherein the at least one of the plurality of different control input devices comprises one of a joystick control input device, a paddle control input device, a potentiometer control input device, and a switch control input device.

8. The remote control system of claim 7, wherein the at least one of the plurality of different control input devices comprises a plurality of control input devices selected from a group consisting of joystick control input devices, paddle control input devices, potentiometer control input devices, and switch control input devices.

9. The remote control system of claim 1, wherein the processor-based remote control unit comprises a connections interface configured to interchangeably connect to the plurality of different control input devices.

10. The remote control system of claim 9, wherein the connections interface includes fifteen of the substantially identical connector interface ports.

11. The remote control system of claim 9, wherein the connections interface includes a first side having a first number of the substantially identical connector interface ports arranged along the first side, and a second side having a second number of the substantially identical connector interface ports arranged along the second side, the second number being different from the first number.

12. The remote control system of claim 1, wherein the signals associated with the at least one of the plurality of different control input devices comprises one of an analog signal and a digital signal.

13. The remote control system of claim 12, wherein each of the substantially identical connector interface ports includes a plurality of pins, and wherein at least one of the pins provides an output signal to the at least one of the plurality of different control input devices.

14. The remote control system of claim 13, wherein the output signal comprises one of an analog signal and a digital signal.

15. The remote control system of claim 1, further comprising an input element to identify the at least one of the plurality of different control input devices.

16. The remote control system of claim 15, wherein the input element comprises a graphic user interface.

17. The remote control system of claim 1, wherein the at least one of the plurality of different control input devices comprises a switch input device, the switch input device being selected from the group consisting of a single pole single throw switch, a single pole double pole switch, a double pole double pole switch, a keyswitch, and an emergency stop switch.

18. A method of remotely controlling at least one auxiliary system of an industrial vehicle including a base station, the method implemented with a processor-based remote control unit interfaced with a plurality of different control input devices via a plurality of substantially identical connector interface ports, the method comprising:
  sampling, with the processor-based remote control unit, signals associated with the at least one of the plurality of different control input devices as the at least one of the plurality of different control input devices is manipulated by an operator;
  mapping, with the processor-based remote control unit, the signals associated with the at least one of the plurality of different control input devices to a control function; and
  communicating the control function to the base station for execution by the auxiliary system of the vehicle.

19. The method of claim 18, wherein the processor-based remote control unit includes a main processor and at least one peripheral processor, wherein sampling signals associated with the at least one of the plurality of different control input devices is performed by the at least one peripheral processor.

20. The method of claim 18, wherein the processor-based remote control unit comprises a connections interface, the substantially identical connector interface ports arranged on the connections interface, and the method further comprises interfacing the at least one of the plurality of different control input devices via one of the connector interface ports.

21. The method of claim 20, further comprising providing each of the substantially identical connector interface ports with a plurality of signal pins.

22. The method of claim 20, further comprising providing at least one cable, and connecting the at least one of the plurality of different control input devices to one of the substantially identical connector interface ports via the cable.

23. The method of claim 18, wherein the at least one of the plurality of different control input devices comprises one of a joystick control input device, a paddle control input device, a potentiometer control input device, and a switch control input device.

24. The method of claim 18, wherein sampling the signals associated with the at least one of the plurality of different control input devices comprises sampling one of an analog signal and a digital signal.

25. The method of claim 18, further comprising providing an output signal to the at least one of the plurality of different control input devices.

26. The method of claim 25, wherein providing the output signal comprises providing one of an analog signal and a digital signal.

27. The method of claim 18, further comprising identifying, to the processor-based remote control unit, the type of the at least one of the plurality of different control input devices to be manipulated by the operator.

28. The method of claim 18, further comprising identifying the type of the at least one of the plurality of control input devices with a graphic user interface.

29. The method of claim 18, wherein the at least one of the plurality of different control input devices comprises a switch input device, the switch control input device being selected from the group consisting of a single pole single throw switch, a single pole double pole switch, a double pole double pole switch, a keyswitch, and an emergency stop switch.

* * * * *